United States Patent
Wang

(10) Patent No.: US 6,584,280 B1
(45) Date of Patent: Jun. 24, 2003

(54) AQUARIUM HEATER

(75) Inventor: Chiao-Ming Wang, Taichung Hsien (TW)

(73) Assignee: Meiko Pet Corporation, Taichung Hsien (TW)

( * ) Notice: Subject to any disclaimer, the term of this patent is extended or adjusted under 35 U.S.C. 154(b) by 0 days.

(21) Appl. No.: 10/216,737

(22) Filed: Aug. 13, 2002

(51) Int. Cl.[7] ................................................. H05B 1/12
(52) U.S. Cl. ........................ 392/498; 219/494; 392/503
(58) Field of Search ................................. 392/498, 503; 219/494

(56) References Cited

U.S. PATENT DOCUMENTS 5,392,380 A * 2/1995 Tsai ........................... 392/498
5,568,587 A * 10/1996 Marioni ...................... 392/498

* cited by examiner

Primary Examiner—Thor Campbell
(74) Attorney, Agent, or Firm—Rosenberg, Klein & Lee

(57) ABSTRACT

An improved aquarium heater and particularly an aquarium heater that has a protective device adjacent to an electric heating coil to cut off the electric circuit when the heater is overloaded to prevent the heating coil from continuously heating to avoid risks and hazards includes a glass tube housed a circuit board in an upper section thereof, a heating coil located below the circuit board connecting to the circuit board, a control plug sealed the top opening of the glass tube, and a protective device bridging the heating coil and the circuit board. The protective device cuts off circuit operation when total circuit is overloaded and overheated to ensure safely use of the heater.

3 Claims, 2 Drawing Sheets

AQUARIUM HEATER

BACKGROUND OF THE INVENTION

1. Field of the Invention

The invention relates to an improved aquarium heater and particularly an aquarium heater that is capable of cutting off the electric circuit of the heater when overloaded to protect the safety of the heater and usage.

2. Description of the Prior Art

These days aquariums are not only for growing aquarium fish, they also may be used as ornamental articles to match interior design and landscape decoration to foster pleasant atmosphere of households or working environments. Maintaining water stability is a very important issue for aquariums. Water temperature and impurity in the aquarium have to be controlled properly to enable fish and plants to live and flourish. Conventional heaters for controlling water temperature heat the water when electricity is supplied. While it is possible to set the temperature of heating, they generally do not have safety designs. If overload occurs during heating process, the heater is burnt out if users do not take remedy action properly and timely. It causes a lot of safety concerns. Although some heaters have included a fuse for protection purpose, the fuse is located inside the heater. Once the fuse is burnt out, the hater has to be discarded and cannot be repaired. It is a waste and an unnecessary burden to users.

SUMMARY OF THE INVENTION

In view of the aforesaid disadvantages, the primary object of the invention is to provide an improved aquarium heater that can prevent the risk when the heater is overloaded during heating.

The aquarium heater according to the invention includes a protective device equipped with an elastic strip switch bridging between a heating coil and a circuit board. When the total circuit is overloaded, circuit operation may be shut down to protect the safety of the heater.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
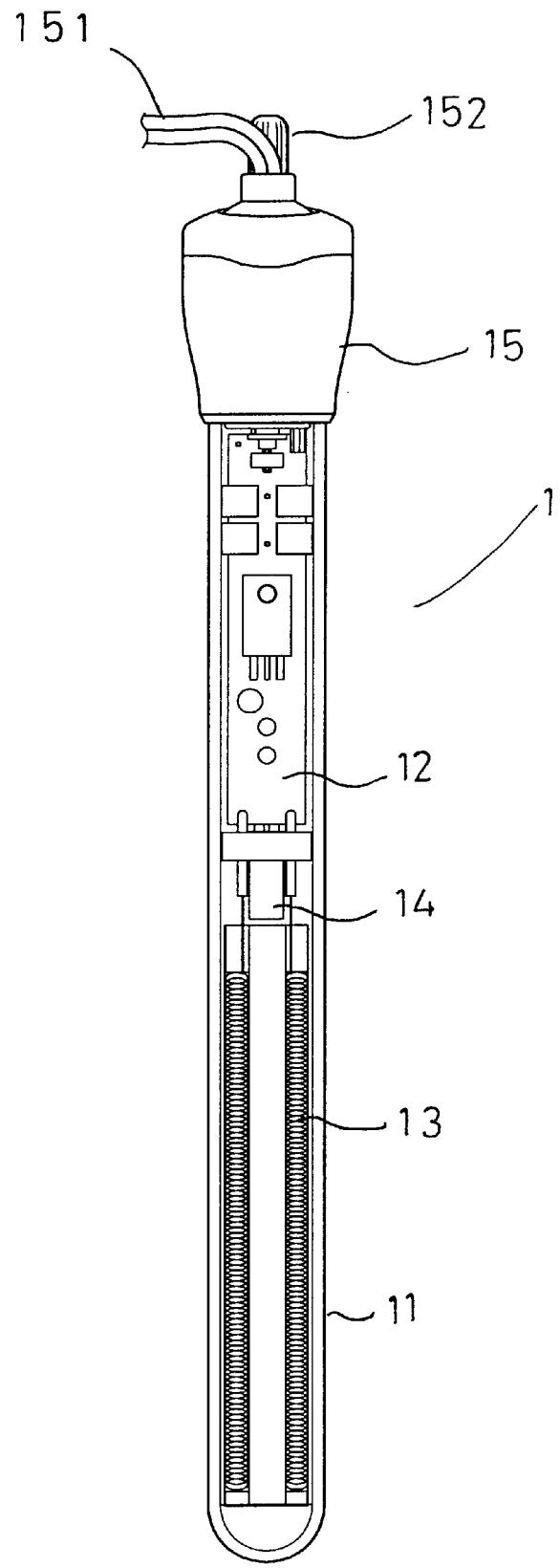
FIG. 1 is a schematic view of the invention.

Referring to FIG. 1, the aquarium heater 1 of the invention mainly includes a circuit board 12 located in a glass tube 11, a heating coil 13 connecting to the circuit board 12, and a control plug 15 sealed a top opening of the glass tube 11.

The glass tube 11 has a top opening and houses therein the circuit board 12 and the heating coil 13. The top opening is sealed by the control plug 15 to make the glass tube 11 to become a closed compartment.

The circuit board 12 has an upper end connected to the control plug 15 and a lower end connected to the heating coil 13. On the circuit board 12, there are a thermostat element and a temperature sensor (not shown in the drawing) to measure water temperature and control heating of the heating coil 13.

The heating coil 13 is a heating element made from an electric heating wire or an electric heating resistor. It is connected to and controlled by the circuit board 12 to generate heating source.

The control plug 15 seals the glass tube 11 and connects to the circuit board 12 to allow a power cord 151 to supply electric power and enable users to regulate water temperature through a thermostat rod 152.

There is a protective device 14 located between the heating coil 13 and the circuit board 12. The protective device 14 is an elastic strip switch that is expandable when heated and retractable when cooled. Thus when the total circuit is overloaded and becomes overheated, the protective device 14 cuts off the circuit to stop circuit operation. When the temperature returns to a normal condition, the circuit resumes operation. Therefore the heater may operate and be used safely.

Figure 2:
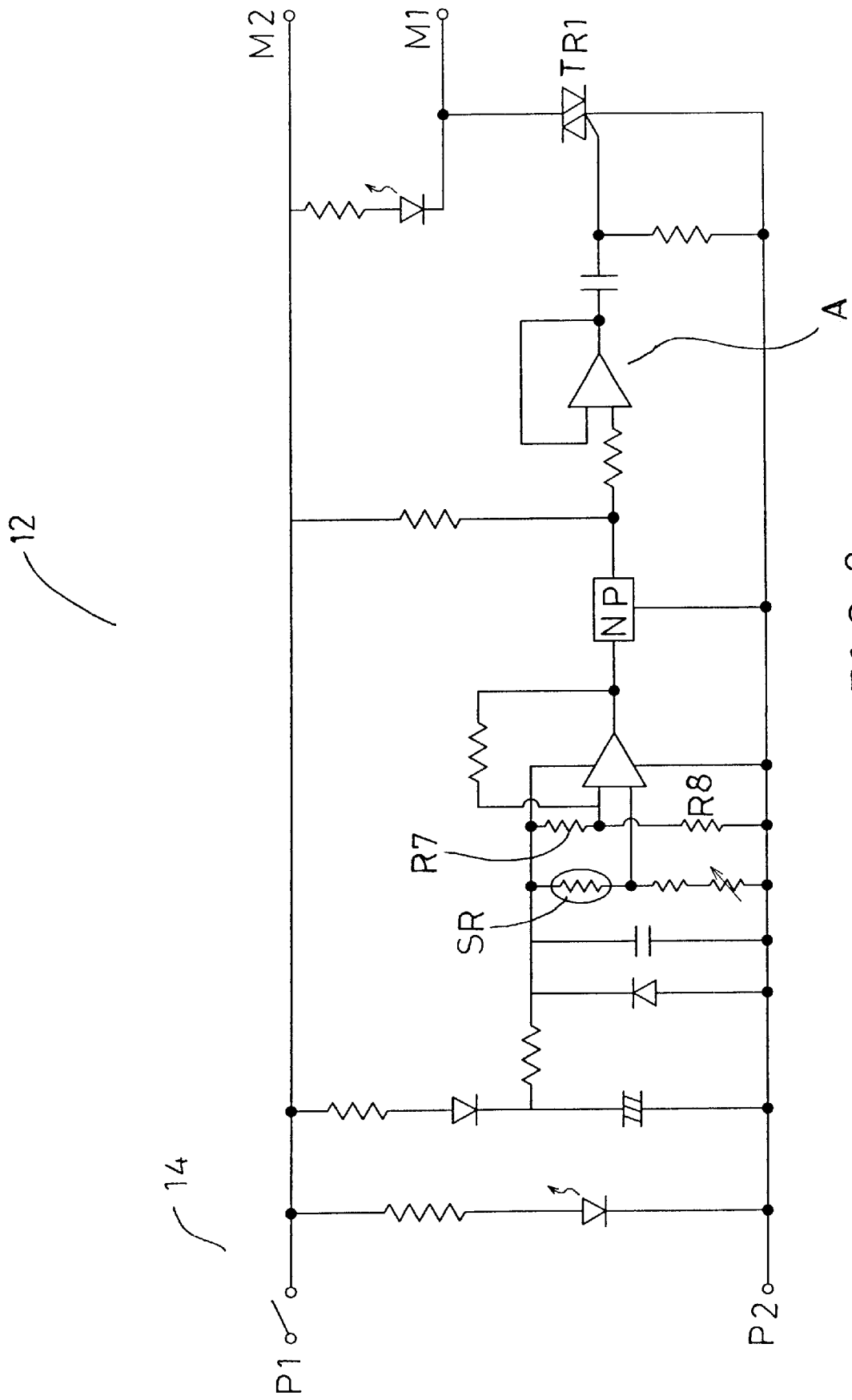
FIG.2 is a circuit diagram of the invention.

Refer to FIG. 2 for the circuit diagram of the invention. Electric power is supplied through the power cord 151 which runs through the control plug 15 (connecting P1 and P2). Required water temperature is set by the thermostat rod 152. The temperature sensor SR on the circuit board 12 measures the temperature. If water temperature is below a preset temperature, the heating coil 13 is triggered to heat and raise the water temperature in the aquarium. The circuit is a comparison circuit consisting of an OP comparator with a basal voltage formed by two resistors R7 and R8. When the temperature sensor SR measures the water temperature that is lower than the preset value, the resistance increases, and the voltage of the comparison circuit is lower than the basal voltage, therefore the OP comparator A outputs a higher voltage electricity to make a silicon thyristor TRI conductive. As a result, the M1 and M2 sections output a voltage to heat the heating coil 13. On the other hand, when the temperature sensor SR measures the water temperature that is higher than the preset value, the resistance decreases, and the voltage of the comparison circuit is higher than the basal voltage, therefore the OP comparator A outputs a lower voltage electricity to make the silicon thyristor TRI non-conductive. As a result, the M1 and M2 sections also are not conductive, and the heating coil 13 is not heated.

When the circuit operation mentioned above is overloaded, the protective device 14 breaks to cut off input power supply P1 and P2, and the circuit board 12 stops functioning.

By means of the construction set forth above, the protective device of the invention can automatically cut off circuit operation when the heater is overloaded to prevent risks or hazards from taking place.

What is claimed is:

1. An aquarium heater comprising:

a glass tube having a top opening, housing a circuit board and a heating coil and a protective elastic strip switch; said heating coil being connected to the circuit board;

a first protective device defining a control circuit contained within the circuit board including a temperature sensor for sensing water temperature in said aquarium, and a comparison circuit for comparing temperature, means for generating a voltage to an output lead when said temperature sensor measures an aquarium temperature below a predetermined value, and substantially zero voltage to said output lead when said temPerature sensor measures said aquarium temperature above said predetermined value; and, a second protective device defining an electrically conductive elastic strip switch coupled to said control circuit at a first end thereof and a second end thereof being displaceable (1) into electrical contact with said heating coil when said temperature sensor measures a temperature below said predetermined value, and (2) out of electrical contact with said heating coil when said temperature sensor measures said aquarium temperature above said predetermined value, whereby circuit operation is cut-off when an overload or overheated condition is determined.

2. The aquarium heater as recited in claim 1 wherein said second protective device is electrically coupled to a thyristor in parallel relation.

3. The aquarium heater as recited in claim 2 wherein said thyristor is electrically coupled to said temperature sensor and said comparison circuit in parallel.

\* \* \* \* \*